Nov. 10, 1959 J. F. MITCHELL 2,912,573
RECEIVER HAVING FREQUENCY-AND-AMPLITUDE-MODULATION-DETECTING LIMITER STAGE
Filed Oct. 17, 1956
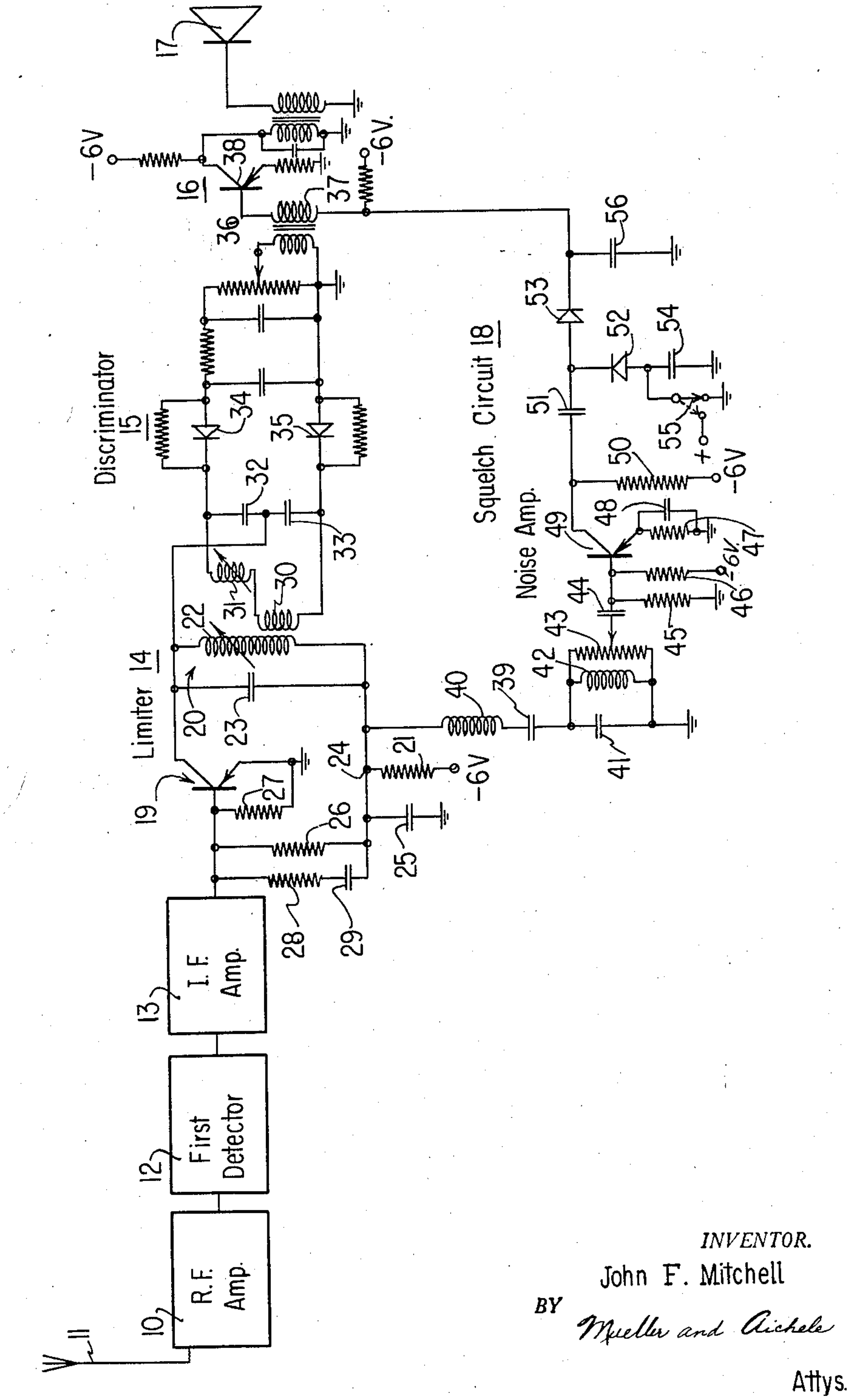
INVENTOR.
John F. Mitchell
BY Mueller and Aichele
Attys.

2,912,573

RECEIVER HAVING FREQUENCY-AND-AMPLITUDE - MODULATION - DETECTING LIMITER STAGE

John F. Mitchell, Berkley, Ill., assignor to Motorola, Inc., Chicago, Ill., a corporation of Illinois Application October 17, 1956, Serial No. 616,473

5 Claims. (Cl. 250—20)

The present invention is directed to a frequency-modulation communication receiver which incorporates a suppression circuit for automatically muting the output thereof whenever a received signal falls below a predetermined threshold or when no signal is received so as to provide what is commonly termed an "inter-channel noise suppression" control for the receiver.

With many types of communication receivers, it is usual for the signal reproducer to produce objectionable noise during intervals when no signal is being received as, for example, when the receiver is tuned from one signal channel to another. These noises arise from locally generated high frequency disturbances, shot effects in the tubes, thermal agitation in the circuits of the receiver, and from other causes. To overcome the annoying effects of these noises, suppression or "squelch" circuits have been proposed for muting the receiver except when it is tuned to a signal of sufficient strength to override the noise level and provide satisfactory reproduction.

Most frequency modulation receivers inherently provide a high signal-noise ratio for received signals over a certain minimum amplitude threshold. This high signal-noise ratio is due mostly to the amplitude limiters included in the receiver, and which limiters tend to remove any amplitude modulation appearing on the frequency modulation signal translated thereby. In order to realize the full possibilities of frequency modulation reception, it is usual for the high frequency stages of the receiver to provide a sufficiently high degree of amplification so that the effects of thermal agitation in the tuned input circuit of the receiver and the shot effects in the first radio frequency input stage cause voltages to be impressed on the amplitude limiters which approach the level required to saturate these limiters. Whenever a frequency modulated signal strong enough to be amplitude limited by the limiters is received, these voltages are reduced to a low level at the output of the final limiter and do not cause objectionable disturbances in the sound reproducer. However, whenever the amplitude of the received frequency modulated signal drops below a usable level, or in the absence of such signals, noise voltages of appreciable amplitudes appear in the output of the limiters which can produce an extremely irritating audible background noise, especially between the signal channels when the receiver is tuned from one signal to another. It is most desirable, therefore, to provide some means for suppressing these noise disturbances that arise in the absence of a usable received signal.

It is, accordingly, an object of the present invention to provide a frequency modulation communication receiver incorporating improved means which effectively respond to an increase in the noise level in the receiver during intervals when the received signal level falls below a selected threshold and which effectively mutes the output of the receiver for such intervals.

Another object of the invention is to provide such an improved receiver in which the noise suppression means is highly sensitive in its operation and yet is relatively simple in its composition and does not add materially to the cost of the receiver.

A further object of the invention is to provide a simplified detector for noise signals to be utilized in the squelch system of a frequency modulation receiver.

A feature of the invention is the provision of a frequency-modulation receiver which includes a transistor amplitude limiter stage which also functions as a detector for the noise signals, and which receiver also includes a transistor amplifier and diode rectifier which responds to the detected noise signals to produce a unidirectional control voltage for muting the output stage of the receiver whenever the detected noise signals exceed a predetermined threshold.

Another feature of the invention is the provision of such an improved noise suppression circuit in which the diode rectifier also functions as a temperature stabilizer for the output stage of the receiver, which output stage may conveniently be a power transistor amplifier.

Yet another feature of the invention is the provision of a frequency modulation receiver which includes an amplitude limiter stage that also functions as a frequency-modulation detector of the slope type which detects any frequency-modulated signals. This detector is used to derive noise from the intermediate frequency signal to provide a control voltage for suppressing the output of the receiver whenever the signal translated by the receiver disappears or drops below a usable amplitude level.

A further feature of the invention is the provision of a low impedance source for the noise signals detected by the amplitude limiter, namely, the bias voltage decoupling resistor of the limiter, so as to provide a proper impedance match for the subsequent transistor amplifier in the noise suppression circuit. This makes the detector particularly advantageous since it may be used as the audio detector in a transistor receiver and will directly match a transistor audio amplifier so that the step down transformer normally required may be eliminated.

The above and other features of the invention which are believed to be new are set forth with particularity in the claims. The invention itself, however, together with further objects and advantages thereof, may best be understood by reference to the following description when taken in conjunction with accompanying drawing in which the single figure shows an improved communication receiver constructed in accordance with the invention to provide inter-channel squelching or muting action.

The invention provides a communication receiver for utilizing frequency modulated wave signals and which includes an amplitude limiter stage incorporating a transistor having base, emitter, and collector electrodes. The receiver also includes means for selectively receiving the frequency modulated wave signals and for impressing such signals on the base electrode, means for connecting the emitter electrode to a point of reference potential, and a tuned output circuit including inductance means connected to the collector electrode. A capacitor provides a low impedance path from the lower side of the tuned output circuit to the point of reference potential for intermediate frequency currents. A resistor connects the lower side of the tuned output circuit to a source of biasing potential, and detected noise voltages appear across this resistor whenever the amplitude level of the frequency modulated wave signals impressed on the limiter falls below a predetermined value. An amplifier is coupled to the resistor for amplifying the noise voltages appearing across the resistor. A frequency selective network between this resistor and amplifier prevents signals other than noise above the audio range from reaching the amplifier. Diode rectifier means is connected to the amplifier for producing a control voltage in response to the noise voltages amplified by the amplifier. An audo output stage including a transistor is provided, the transistor having an input electrode series connected with said rectifier means to current-stabilize the last-mentioned transistor and to provide muting for the output stage whenever the control voltage rises above a selected level.

The communication receiver illustrated in the single figure is intended to utilize a frequency modulated wave and it includes a radio frequency amplifier 10 of any desired number of stages. The radio frequency amplifier has input terminals connected to a suitable antenna 11 and has output terminals connected to a first detector 12. The first detector is, in turn, connected to an intermediate frequency amplifier 13 which, likewise, may have any desired number of stages.

The intermediate frequency amplifier is coupled through a transistor limiter stage 14 to a discriminator detector 15, and the discriminator is coupled through an audio frequency transistor amplifier 16 to a usual sound reproducer 17. The limiter 14 is also coupled to a noise suppression circuit 18 which responds to an increase in the noise level in the receiver to mute the amplifier stage 16 in a manner that will be discussed in detail herein.

Briefly, the receiver responds to a frequency modulated wave intercepted by antenna 11, and this wave is amplified in radio frequency amplifier 10 and heterodyned to the selected intermediate frequency of the receiver in first detector 12. The resulting intermediate frequency signal is amplified in intermediate frequency amplifier 13, limited in amplitude limiter 14, and detected in discriminator 15. The resulting audio signal is amplified in amplifier 16 and supplied to reproducer 17.

During intervals of no reception by the receiver, such as when it is tuned from one station to the other, the resulting rise in the noise level in the receiver produces noise signals which are detected by limiter 14, in a manner to be described, and the detected noise signals are amplified and rectified in circuit 18 to provide a squelch or muting control signal or voltage for amplifier 16.

The amplitude limiter 14 includes a transistor 19 and the intermediate frequency amplifier 13 is connected to the base electrode of this transistor through a usual interstage coupling circuit (not shown). The emitter electrode of the transistor is connected to a point of reference potential or ground, and the collector electrode is connected through a tuned network 20 and a series decoupling resistor 21 to a suitable D.C. biasing source such as the negative terminal of a 6-volt biasing source. The tuned circuit 20 includes an inductance coil 22 shunted by a capacitor 23, which capacitor may be formed by the stray distributed capacity of the circuit. Coil 22 is tunable by a usual moving slug arrangement, and the tuned circuit is tuned to the intermediate frequency. The common junction 24 of the tuned circuit 20 and resistor 21 is connected to ground through a capacitor 25 which provides a low impedance path for the intermediate frequency alternating currents. This point is also connected to ground through a voltage divider arrangement of resistors 26 and 27, which voltage divider provides an appropriate bias potential to the base electrode, with respect to the bias impressed on the collector. The base electrode is also coupled to point 24 through a neutralizing circuit including resistor 28 and series capacitor 29. The I.F. signals appear across capacitor 25 with sufficient amplitude that they may be picked up at point 24 for neutralizing purposes, with resistor 28 providing the proper phase for the neutralizing signals.

Coil 22 is coupled to the discriminator by inductive coupling to a coil 30 in the discriminator input circuit. Coil 30, itself, is not tunable but it is connected in series with a tunable inductance coil 31 and, these series connected coils are shunted by capacitors 32 and 33 connected in series. The tuned circuit 20 and the discriminator input circuit together form a double tuned circuit. The common junction of the capacitors is connected to the collector of transistor 19 to provide the usual discriminator atcion. This particular coupling between coil 22 and the coils 30, enables variable coil 31 to be mounted on an independent form so that both coils 22 and 31 may conveniently be tuned from the same direction instead of from the opposite ends of a single coil form, and interaction between the cores is also prevented.

The remainder of the discriminator 15 is a standard circuit which includes a pair of diodes 34, 35 connected in the usual manner. The output circuit of the discriminator includes an output transformer 36 having a secondary winding 37. One side of the secondary winding is connected to the base electrode of a transistor 38 included in the output amplifier 16, and this transistor is connected as a grounded emitter amplifier.

The point 24 of limiter 14 is coupled through a filter network to the noise amplifier which includes transistor 49. The filter includes elements 39 to 44 inclusive, with choke 40 and capacitor 41 serving to prevent intermediate frequency signals from being applied to the noise amplifier. Capacitor 39, coil 42, and capacitor 44 are for the purpose of preventing audio signals from reaching the noise amplifier. Potentiometer 43 controls the level of noise signals applied to the amplifier 49 and serves as a squelch control for the receiver.

Whenever the receiver is tuned to an unmodulated signal of usable intensity, the limiting action of transistor 19 of limiter 14 is such that no signal appears at the decoupling point 24 of sufficient amplitude to operate the squelch circuit 18. In the absence of a received frequency modulated signal or when there is such a signal but it falls below usable amplitude, the collector and base electrode combination of transistor 19 function as a diode amplitude modulation detector to the intermediate frequency noise signals impressed on the limiter 14, which signals rise in amplitude and appear as noise voltages at decoupling point 24.

However, when the receiver is tuned to a frequency modulated signal of usable intensity, the modulation is detected in limiter 14 and appears at point 24. Transistor 19 functions as a frequency modulation detector of the slope type. This is due to the series combination of tuned network 20, coupled to the tuned discriminator input circuit through coil 30, and the decoupling resistor 21, in conjunction with the diode formed by the base and collector electrodes of the transistor. Any variations of the frequency of the intermediate frequency carrier from the center frequency are translated into amplitude variations and produce a corresponding change in the current flow from the collector to the base with a corresponding change in the voltage across the decoupling resistor 21. When the transistor limiter acts as a frequency modulation detector as described, the collector diode traverses both forward and back biased regions. For best operation of this transistor detector, the slope filter should be transformer-coupled to the limiter collector circuit and this is provided by the discriminator secondary circuit. This prevents the collector when operating in the forward biased region from loading the slope filter and lowering its Q.

As previously noted, the parameters of the input circuit to transistor 49 are made such that the resulting detection of the frequency modulation intelligence during the reception of a frequency modulated signal by the receiver has insufficient amplitude after passing through this input filter circuit to produce an output signal from transistor 49 which would produce spurious muting action at the output of the receiver. However, in the absence of a translated signal in transistor 19, both amplitude modulated and frequency modulated noise signals are detected and appear across resistor 21 for increased muting action.

It should also be noted that resistor 21 constitutes a relatively low impedance source for the muting noise signals, which source is appropriate for driving transistor amplifier 49 and providing impedance match with the input circuit thereof. Modulation in the audio range as well as noise above the audio range appears across this source, but the signals in the audio range are prevented from entering the noise amplifier by the filtering action described above. The filter network, however, passes frequencies above a minimum frequency to thereby transmit noise above the audio band to the noise amplifier so that such signals will be amplified and applied to control the squelch as will be further described.

Considering now more particularly the noise amplifier including the transistor 49, resistors 45 and 46 form a voltage divider for providing the desired bias to the base electrode of the transistor. The emitter electrode is connected to ground through resistor 47 which is by-passed by capacitor 48. Potential for the collector electrode is applied through resistor 50. The amplifier so biased has the required temperature stability and the necessary gain to provide the squelch controlling voltage.

The amplified noise signals at the output of transistor 49, which appear across load resistor 50 in the collector circuit of transistor 49, are applied to the voltage doubler circuit formed by capacitor 51, diode 52, diode 53, and condenser 56. This circuit functions in a well known manner to provide a voltage across capacitor 56 of double the amplitude of noise signals. Capacitor 54 is connected in series with diode 52 and is bridged by switch 55. During reception switch 55 is closed as shown so that diode 52 is grounded. During transmission a positive potential is applied through switch 55 across capacitor 54 which is transferred to capacitor 56 to squelch the audio.

The control voltage across capacitor 56 places a positive bias on the base electrode of transistor 38 through winding 37, and it effectively mutes the audio amplifier 16 for the duration of such noise signals. Immediately when the receiver is tuned to a frequency modulation signal, the limiting action of the transistor 19 of limiter 14 again is such that no signals appear at point 24 of high enough frequency to be amplified by transistor 49. Therefore, the muting effect of audio amplifier 16 is immediately removed. Thus effective muting of the receiver is obtained for inter-channel squelch or whenever the received signal falls below a usable level.

It should be further noted that the diode rectifiers 52, 53 also serve as a temperature stabilizing means for amplifier 16. As the temperature of transistor 38 rises, the collector electrode will tend to draw more current, and the rectifiers will reduce the bias as the temperature rises to oppose the increased current through the transistor.

In a constructed embodiment of the invention, the following values were used, and these are listed herein merely by way of example, and are not intended to limit the invention in any way:

| | | |
|---|---|---|
| Resistor **21** | kilohms | 1 |
| Capacitor **25** | microfarads | .02 |
| Resistor **26** | kilohms | 33 |
| Resistor **27** | do | 1.5 |
| Resistor **28** | ohms | 120 |
| Capacitor **29** | micromicrofarads | 800 |
| Capacitor **39** | microfarads | .05 |
| Coil **40** | millihenries | .62 |
| Capacitor **41** | microfarads | .01 |
| Coil **42** | millihenries | 5.7 |
| Resistor **43** | kilohms | 2 |
| Capacitor **44** | microfarads | .05 |
| Resistor **45** | kilohms | 1.5 |
| Resistor **46** | do | 6.8 |
| Resistor **47** | kilohms | 1 |
| Capacitor **48** | microfarads | 4 |
| Resistor **50** | kilohms | 2.2 |
| Capacitor **51** | microfarads | .1 |
| Capacitor **54** | do | .01 |
| Capacitor **56** | do | 15 |

The invention provides, therefore, an improved communication receiver in which sensitive muting action is provided by means of a relatively simple and inexpensive transistor circuit. Noise detection is provided by the transistor limiter circuit and noise above a predetermined frequency is selected and amplified to provide the squelch controlling voltage. The limiter provides a low impedance output which matches the transistor amplifier to provide a simple circuit which provides high gain. The noise rectifiers for controlling the audio stage also provide temperature stabilization therefor to further improve the overall circuit.

I claim:

1. In a communication receiver for utilizing frequency modulated wave signals, the combination including, a signal translating stage including a transistor having an input electrode, an output electrode, and a common electrode, means for selectively receiving the frequency modulated wave signals and for impressing such signals between said input and common electrodes of said transistor, an output circuit connected to said output electrode and including a resonant network and series-connected resistor means connecting such output electrode to a source of biasing potential, said signals applied between said input and common electrodes of said transistor including noise signals and having levels to produce limiting action in said transistor, said transistor providing rectifier action between said input electrode and said output electrode when limiting action takes place in said transistor, the circuit including said input electrode and said output electrode of said transistor and said resonant network forming a detector circuit, said resonant network being tuned so that said detector circuit forms a slope type frequency detector whereby the frequency modulation of the frequency modulated wave signals appears in detected form across said resistor means, and a utilization network coupled to said resistor means for utilizing the detected signals appearing thereacross.

2. In a communication receiver for utilizing modulated wave signals, the combination including, a signal translating stage including a transistor having an input electrode, an output electrode, and a common electrode, means for selectively receiving the modulated wave signals and for impressing such signals between said input and common electrodes of said transistor, an output circuit connected to said output electrode and including resistor means connecting such output electrode to a source of biasing potential and capacitor means bypassing said resistor means, the signals applied between said input and common electrodes of said transistor including noise signals and having levels to produce limiting action in said transistor, said transistor providing rectifier action between said input electrode and said output electrode when limiting action takes place in said transistor, a detector circuit including the rectifier provided by said input electrode and said output electrode of said transistor and including said output circuit, said resistor means and said capacitor means forming a load for said detector circuit with the modulated wave signals appearing thereacross in detected form, and a utilization network coupled to said load circuit for utilizing the detected signals appearing thereacross.

3. In a communications receiver for utilizing frequency modulated wave signals, the combination including, an amplitude limiter stage including a transistor having a base electrode, an emitter electrode, and a collector electrode, means connecting said emitter electrode to a point of reference potential, an output circuit including a resonant network and resistor means series-connected between said collector electrode and a source of biasing potential, means for selectively receiving the frequency modulated signals and heterodyning the same to intermediate frequency signals, means for impressing said intermediate frequency signals together with noise signals on said base electrode of said transistor, the signals applied to said base electrode of said transistor being at a level to cause the base-collector junction thereof to traverse both forward and back biased regions to provide rectifier action therebetween, the circuit including said parallel-resonant network, the rectifier formed by said base and collector electrodes of said transistor and said resistor means forming a detector circuit, said resonant network being tuned so that said detector circuit forms a slope type frequency detector whereby the frequency modulation of the intermediate frequency signals appears in detected form across said resistor means, and a utilizing network coupled to said resistor means for utilizing the detected signals appearing thereacross.

4. In a communications receiver for utilizing frequency modulated wave signals, the combination including, an amplitude limiter stage including a transistor having a base electrode, an emitter electrode, and a collector electrode, means connecting said emitter electrode to a point of reference potential, a double tuned parallel-resonant network, an output circuit including said network and capacitor means series-connected between said collector electrode and said point of reference potential, resistor means connecting the junction of said network and said capacitor to a source of biasing potential, means selectively receiving the frequency modulated signals and heterodyning the same to intermediate frequency signals, means for impressing said intermediate frequency signals together with noise signals on said base electrode of said transistor, the signals applied to said base electrode of said transistor being at a level to cause the base-collector junction thereof to traverse both forward and back biased regions to provide rectifier action therebetween, a detector circuit including said parallel-resonant network, the rectifier formed by said base and collector electrodes of said transistor and a detector load including said capacitor means and said resistor means, said parallel-resonant network being tuned so that said detector circuit forms a slope type frequency detector whereby the frequency modulation of the intermediate frequency signals appears in detected form across said detector load, and a utilizing network coupled to said detector load for utilizing the detected signals appearing thereacross.

5. In a communication receiver for utilizing frequency modulated wave signals, the combination including, an amplitude limiter stage including a transistor having a base electrode, an emitter electrode, and a collector electrode, means for connecting said emitter electrode to a point of reference potential, means for selectively receiving the frequency modulated signals and for heterodyning the received signals to an intermediate frequency signal having a selected center frequency, a parallel-resonant network and a capacitor series connected between said collector electrode and said point of reference potential, resistor means connecting the junction of said resonant network and said capacitor to a source of biasing potential, means for impressing said intermediate frequency signal and noise signals on said base electrode at levels to produce limiting action in said transistor, said base and collector electrodes of said transistor forming a rectifier when limiting action takes place in said transistor, said resonant network being tuned essentially to the center frequency of said intermediate frequency signal, said resonant network and said rectifier forming a detector circuit deriving amplitude modulation and frequency modulation from the intermediate frequency signal, with such modulation appearing in detected form across said resistor means, a discriminator-detector circuit coupled to said parallel-resonant network for detecting said intermediate frequency signal, an output amplifier coupled to said discriminator-detector circuit and including a second transistor having a base electrode, a transistor noise amplifier including an inductance-capacity frequency-selective input circuit coupled to said resistor means for amplifying the noise signals appearing thereacross and having a frequency exceeding a predetermined minimum value, rectifier means connected to said noise amplifier for rectifying said noise signals translated by said noise amplifier to produce a unidirectional control voltage, and means for impressing said control voltage on said base electrode of said second transistor to bias the same, said second transistor being of a construction such that its conductivity increases as the temperature thereof rises, and said rectifier means being of a construction such that its internal resistance decreases as the temperature thereof rises so that said control voltage decreases to reduce the bias on said second transistor in response to such temperature rise to thereby oppose said increase in conductivity of said second transistor.

References Cited in the file of this patent

UNITED STATES PATENTS

| | | |
|---|---|---|
| 2,323,880 | Carnahan | July 6, 1943 |
| 2,404,338 | Worchester | July 16, 1946 |
| 2,527,617 | Berger | Oct. 31, 1950 |
| 2,652,460 | Wallace | Sept. 15, 1953 |
| 2,751,493 | Hargrove | June 19, 1956 |

OTHER REFERENCES

Ettinger, George M.: "Transistor Amplifiers for Analog Computers," Electronics, July 1955, pp. 119–120.

Ballard, R. C.: "A Portable Transistor FM-Receiver," Tele-Tech, August 1953, pp. 97 and 206–207.